United States Patent
Yamada et al.

(10) Patent No.: US 12,409,878 B2
(45) Date of Patent: Sep. 9, 2025

(54) STEERING DEVICE AND METHOD OF WRAPPING SYNTHETIC LEATHER

(71) Applicant: TOYODA GOSEI CO., LTD., Kiyosu (JP)

(72) Inventors: Tatsuya Yamada, Kiyosu (JP); Seiji Egawa, Kiyosu (JP); Kazuki Nemoto, Kiyosu (JP); Shintaro Nakamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/602,109

(22) Filed: Mar. 12, 2024

(65) Prior Publication Data

US 2024/0326893 A1 Oct. 3, 2024

(30) Foreign Application Priority Data

Mar. 29, 2023 (JP) .................................. 2023-053604
Feb. 26, 2024 (JP) .................................. 2024-026295

(51) Int. Cl.
*B62D 1/04* (2006.01)
*B32B 1/00* (2024.01)
(Continued)

(52) U.S. Cl.
CPC .................. *B62D 1/06* (2013.01); *B32B 3/14* (2013.01); *B32B 7/09* (2019.01); *B32B 1/00* (2013.01); *B32B 9/025* (2013.01); *B32B 15/08* (2013.01); *B32B 2307/536* (2013.01); *B32B 2307/546* (2013.01); *B32B 2605/003* (2013.01)

(58) Field of Classification Search
CPC .... B62D 1/06; B32B 1/00; B32B 3/14; B32B 7/09; B32B 9/025; B32B 15/08; B32B 2307/536; B32B 2307/546; B32B 2605/003
See application file for complete search history.

(56) References Cited

U.S. PATENT DOCUMENTS 4,179,950 A * 12/1979 Valley ...................... G05G 1/10
    74/558
6,065,366 A *  5/2000 Koyama .................. B62D 1/06
    428/317.1
(Continued)

FOREIGN PATENT DOCUMENTS

CN         1686743 A   * 10/2005
CN       218172379 U   * 12/2022
(Continued)

OTHER PUBLICATIONS

Machine translation of KR 0132355 Y1 obtained on Apr. 24, 2025.*

*Primary Examiner* — Adam D Rogers
(74) *Attorney, Agent, or Firm* — Posz Law Group, PLC (57) ABSTRACT

The steering device includes a main body including a metal core, and a synthetic leather part wrapped around the main body. The synthetic leather part includes a first synthetic leather part, a second synthetic leather part made of a different material from the first synthetic leather part, and a first sewing part having a linear shape formed by sewing the first synthetic leather part and the second synthetic leather part together. The first sewing part is formed to extend in a direction not toward a center of the steering device in a front view of the steering device.

3 Claims, 6 Drawing Sheets

(51) Int. Cl.
  *B32B 3/02* (2006.01)
  *B32B 3/14* (2006.01)
  *B32B 7/04* (2019.01)
  *B32B 7/09* (2019.01)
  *B32B 9/02* (2006.01)
  *B32B 15/04* (2006.01)
  *B62D 1/06* (2006.01)
  *B32B 15/08* (2006.01)

(56) References Cited

U.S. PATENT DOCUMENTS

| | | | |
|---|---|---|---|
| 9,598,098 B2 * | 3/2017 | Sakurai | B62D 1/04 |
| 9,758,187 B2 * | 9/2017 | Nonoyama | B62D 1/065 |
| 9,789,895 B2 * | 10/2017 | Yasui | B32B 9/025 |
| 10,836,420 B2 * | 11/2020 | Lai | B32B 9/047 |
| 11,066,092 B2 * | 7/2021 | Nonoyama | B60R 11/00 |
| 11,390,312 B2 * | 7/2022 | Hotta | C09D 11/52 |
| 11,584,423 B2 * | 2/2023 | Shinmen | B32B 5/265 |
| 11,912,332 B2 * | 2/2024 | Quintard | B62D 1/06 |
| 2009/0178509 A1 | 7/2009 | Seidl | |
| 2014/0224059 A1 * | 8/2014 | Morita | B62D 1/065 |
| | | | 74/558 |

FOREIGN PATENT DOCUMENTS

| | | | | | |
|---|---|---|---|---|---|
| CN | 115716499 | A | * | 2/2023 | B62D 1/06 |
| JP | 2000108907 | A | * | 4/2000 | |
| JP | 2009-165651 | A | | 7/2009 | |
| JP | 2014094728 | A | * | 5/2014 | |
| JP | 2022067874 | A | * | 5/2022 | |
| KR | 0132355 | Y1 | * | 12/1998 | |
| KR | 20160135963 | A | * | 11/2016 | |
| KR | M584764 | U | * | 10/2019 | |
| WO | WO-2020173736 | A2 | * | 9/2020 | B62D 1/06 |

* cited by examiner

STEERING DEVICE AND METHOD OF WRAPPING SYNTHETIC LEATHER

CROSS REFERENCE TO RELATED APPLICATIONS

The present application claims the priority to Japanese patent application No. 2023-053604 filed on Mar. 29, 2023, and Japanese patent application No. 2024-026295 filed on Feb. 26, 2024. The entire disclosure thereof is incorporated herein by reference.

BACKGROUND

The present disclosure relates to a steering device and a synthetic leather wrapping method.

The technique for wrapping leather around a grip part of a steering device is known well. Japanese patent application laid-open publication No. 2009-165651 discloses the technique of butting and sewing together two end portions of leather.

When stress is applied, distortion may occur in the sewing part where the two end portions of leather are butted and sewed, in some cases. In the well-known technique for natural leather, its heat shrinking property is utilized to reduce the distortion in the sewing part.

There is a demand of using synthetic leather as leather. Synthetic leather, which has lower heat resistance compared to natural leather, hardly allows heat treatment with application of heat to be used to reduce distortion in a sewing part.

SUMMARY

The present disclosure has been made to solve the above-described problem, and may be embodied in the following aspects.

(1) In one aspect of the present disclosure, a steering device is provided. The steering device includes a main body including a metal core, and a synthetic leather part wrapped around the main body. The synthetic leather part has a first synthetic leather part, a second synthetic leather part, and a first sewing part. The second synthetic leather part is made of a different material from the first synthetic leather part. The first sewing part has a linear shape formed by sewing the first synthetic leather part and the second synthetic leather part together. The first sewing part is formed to extend in a direction not toward a center of the steering device in a front view of the steering device.

(2) In the steering device in the aspect above, the first synthetic leather part may have different hardness from the second synthetic leather part.

(3) In the steering device in the aspect above, the first synthetic leather part may have different stretchability from the second synthetic leather part.

(4) In the steering device in the aspect above, the main body may have an upper part, a grip part, and a lower part. The synthetic leather part may further have a third synthetic leather part and a second sewing part. The third synthetic part is made of a different material from the second synthetic leather part. The second sewing part has a linear shape formed by sewing the second synthetic leather part and the third synthetic leather part together. The first synthetic leather part may be wrapped around the upper part, and may be made of a harder material than the second synthetic leather part. The second synthetic leather part may be wrapped around the grip part, and may be made of a more stretchable material than the first synthetic leather part and the third synthetic leather part. The third synthetic leather part may be wrapped around the lower part.

The present disclosure may be embodied in various aspects, for example, a synthetic leather member wrapped around a main body of a steering device.

BRIEF DESCRIPTION OF THE DRAWINGS

Various embodiments of the disclosure are disclosed in the following detailed description and the accompanying drawings.

DETAILED DESCRIPTION

A. First Embodiment

Figure 1:
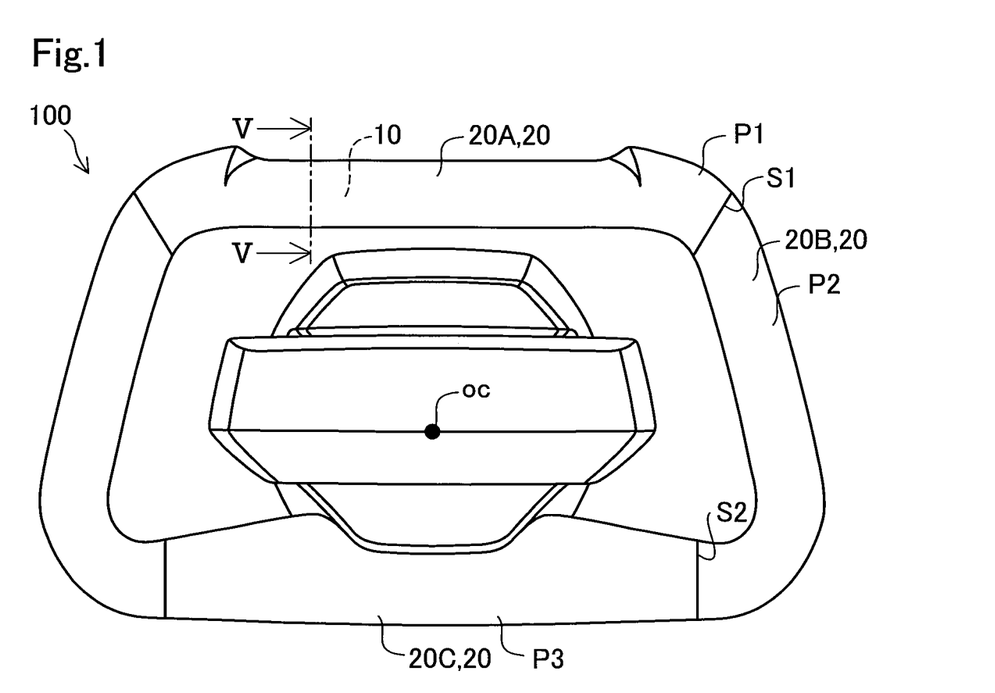
FIG. 1 is a schematic diagram illustrating an overview of the steering device.

FIG. 1 is the schematic diagram illustrating the overview of a steering device 100 in the present embodiment. FIG. 1 shows the front view of the steering device 100. The steering device 100 is held by a vehicle driver. The steering device 100 is operated by a driver, so that the vehicle is steered. The steering device 100 has a center oc as a steering rotation axis. In the present embodiment, the steering device 100 has a substantially rectangular shape. More specifically, the steering device 100 has a substantially trapezoidal shape in which its upper part is shorter than its lower part. The steering device 100 having such a shape is also called an atypical steering device.

The steering device 100 is configured with a main body 10 wrapped with a synthetic leather part 20. In the present embodiment, the main body 10 includes a metal core 11 made of a metal member. The metal core 11, for example, may have an annular shape or a substantially U-shaped. In the present embodiment, the metal core has a substantially U-shaped as shown in the cross-sectional view of FIG. 5. Since the metal core 11 has the substantially U-shaped, the weight of the metal core 11 is lighter than when the metal core 11 has an annular shape. The metal core 11 is arranged such that the substantially U-shaped opening side is directed toward the front of the vehicle, thereby breaking at the time of collision and absorbing collision energy. The main body 10 may include a cushion layer 12 covering the periphery of the metal core 11. The cushion layer 12 is formed of, for example, a resin such as polyurethane, and can improve grip feeling and/or provide electrical insulation performance. The main body 10 may further include a functional layer 13 on the outside of the cushion layer 12. The functional layer 13 is a layer that provides a desired functions, for example, a capacitive sensor sheet that provides a function of detecting gripping of the steering device 100, and/or a heater element that provides a steering heater function. The main body 10 has an upper part, a lower part longer than the upper part, and grip parts each connecting the upper part and the lower part.

In the present embodiment, the synthetic leather part 20 has a first synthetic leather part 20A, second synthetic leather parts 20B, a third synthetic leather part 20C, first sewing parts S1, and second sewing parts S2. The first sewing parts S1 are the linear portions formed by sewing together the first synthetic leather part 20A and the second synthetic leather parts 20B, respectively. The second sewing parts S2 are the linear portions formed by sewing together the second synthetic leather parts 20B and the third synthetic leather part 20C, respectively.

The steering device 100 has a first part P1, second parts P2, and a third part P3. The first part P1 is configured with the main body 10 wrapped with the first synthetic leather part 20A. In the present embodiment, the first synthetic leather part 20A is wrapped around the upper part of the main body 10. In other words, the upper part of the main body 10 corresponds to the first part P1. The second parts P2 are configured with the main body 10 wrapped with the second synthetic leather parts 20B, respectively. In the present embodiment, the second synthetic leather parts 20B are wrapped around the grip parts of the main body 10, respectively. In other words, the grip parts of the main body 10 correspond to the second parts P2. The third part P3 is configured with the main body 10 wrapped with the third synthetic leather part 20C. In the present embodiment, the third synthetic leather part 20C is wrapped around the lower part of the main body 10. In other words, the lower part of the main body 10 corresponds to the third part P3.

The boundary parts between the first part P1 and the second parts P2 correspond to the first sewing parts S1, respectively. The boundary parts between the second parts P2 and the third part P3 correspond to the second sewing parts S2, respectively. In the present embodiment not shown in the drawings, in the first part P1 and the third part P3, the synthetic part 20 may be wrapped only at a part of the area near the end adjoining the second part P2.

As shown in FIG. 1, in the front view of the steering device 100, each of the first sewing parts S1 is formed to extend in a direction not toward the center oc. In addition, in the front view of the steering device 100, each of the second sewing parts S2 is formed to extend in a direction not toward the center oc. The extending directions of the first sewing parts S1 and the second sewing parts S2 are set on the basis of the shape of the main body 10 and/or the design of the steering device 100.

The first synthetic leather part 20A is made of a different material from the second synthetic leather parts 20B. The third synthetic leather part 20C is made of a different material from the second synthetic leather parts 20B. In the present embodiment, the first synthetic leather part 20A is harder than the second synthetic leather parts 20B. The third synthetic leather part 20C is harder than the second synthetic leather parts 20B. In the present disclosure, "a different material" refers to a material different in at least one of hardness and stretchability. For example, a material just different in color is not treated as "a different material".

In the present embodiment, the hardness of a material is represented by the depression amount measured by ST300 Softness Tester of MSA Engineering Systems Limited, with a ring diameter set to 35 mm. As a material is softer, the depression amount of the material is larger. The depression amount of the first synthetic leather part 20A is 4.4 mm, and the depression amount of the second synthetic leather parts 20B is 5.0 mm. The depression amount of the third synthetic leather part 20C is 3.4 mm. In other words, the first synthetic leather part 20A is harder than the second synthetic leather parts 20B, and the third synthetic leather part 20C is harder than the first synthetic leather part 20A.

The second synthetic leather parts 20B are made of a more stretchable material than the first synthetic leather part 20A and the third synthetic leather part 20C. In the present embodiment, the stretchability of a material is represented by the load at which the material is deformed, measured by Technograph TG-10KN Tensile Compression Testing Machine by MinebeaMitsumi Inc., with a crosshead speed set at 200 mm/sec. As a material is more stretchable, the load value of the material is smaller. The load of the first synthetic leather part 20A is 133 N, the load of the second synthetic leather parts 20B is 109 N, and the load of the third synthetic leather part 20C is 181 N. In other words, the second synthetic leather parts 20B are more stretchable than the first synthetic leather part 20A, and the first synthetic leather part 20A is more stretchable than the third synthetic leather part 20C.

Figure 2:
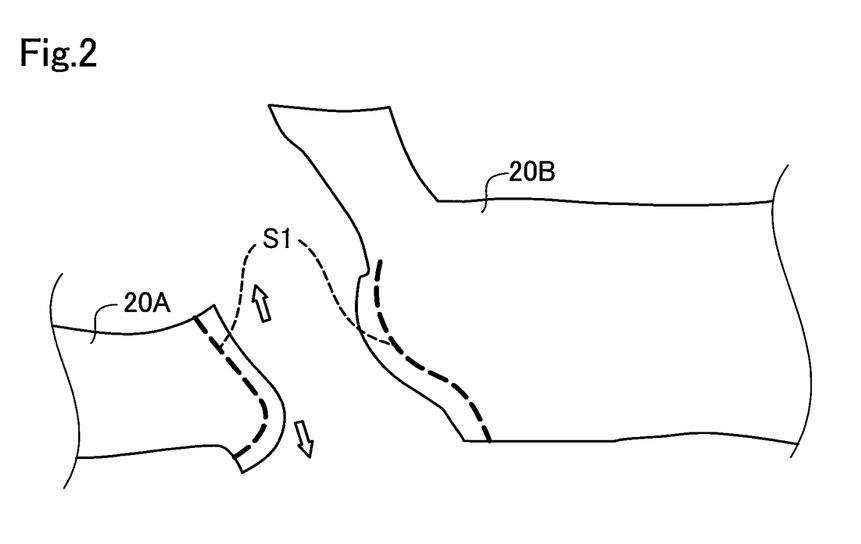
FIG. 2 is an explanatory diagram illustrating sewing of a first synthetic leather part and a second synthetic leather part.

FIG. 2 is the explanatory diagram illustrating the sewing of the first synthetic leather part 20A and the second synthetic leather part 20B. Since the first sewing part S1 is formed to extend in a direction not toward the center oc, the length of the first synthetic leather part 20A along the sewing direction of the first sewing part S1 is shorter than the length of the second synthetic leather part 20B along the sewing direction of the first sewing part S1. In the present embodiment, the first synthetic leather part 20A is sewed to the second synthetic leather part 20B while the edge part of the first synthetic leather part 20A is pulled in the direction of the arrows shown in FIG. 2. Accordingly, stress is applied to the synthetic leather part 20 in the opposite direction to the arrows shown in FIG. 2.

Figure 3:
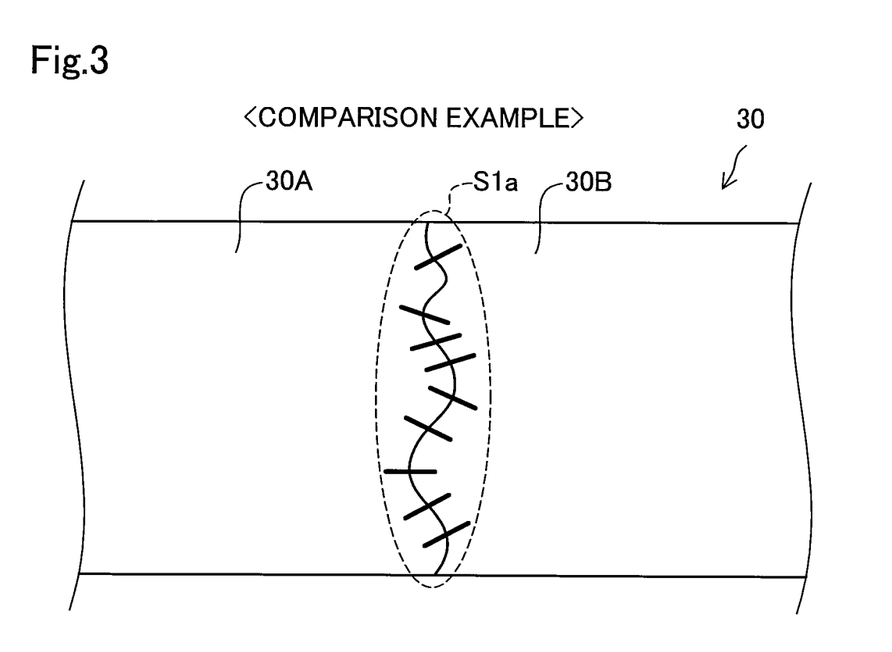
FIG. 3 is an explanatory diagram illustrating a comparison example of a first sewing part.

FIG. 3 is the explanatory diagram illustrating a first sewing part S1a as a comparison example. A synthetic leather part 30 of the comparison example shown in FIG. 3 is different from the synthetic leather part 20 according to the present embodiment in that a first synthetic leather part 30A is made of the same material as a second synthetic leather part 30B. Since the first synthetic leather part 30A is made of the same material as the second synthetic leather part 30B, the stress which has been applied to the synthetic leather part 20 but has not been cancelled out by either the first synthetic leather part 30A or the second synthetic leather part 30B is applied to the first sewing part S1a. This causes significant distortion in the first sewing part S1a, as shown in FIG. 3.

Figure 4:
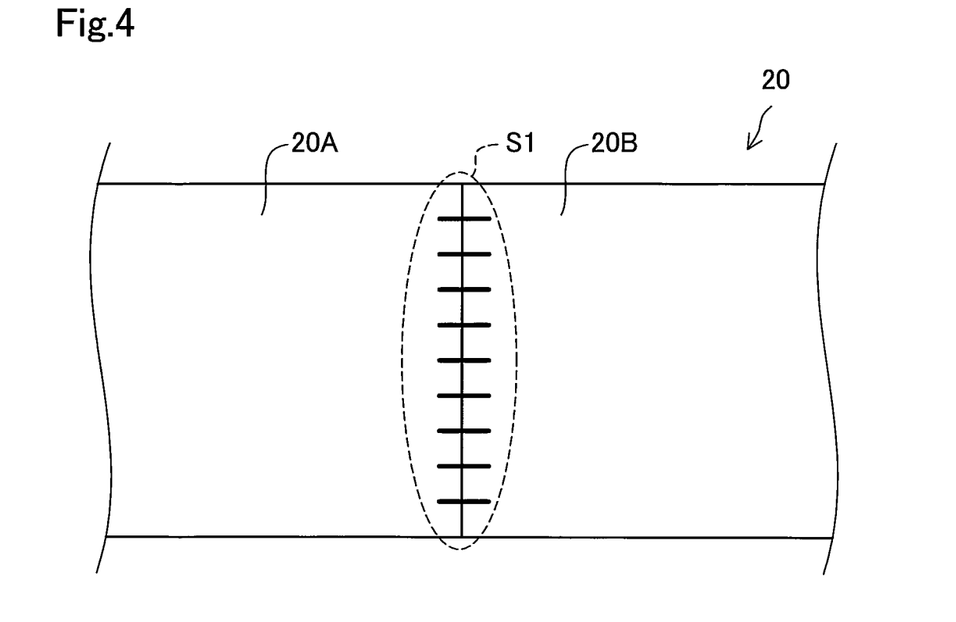
FIG. 4 is an explanatory diagram illustrating the first sewing part.

FIG. 4 is the explanatory diagram illustrating the first sewing part S1. As shown in FIG. 4, in the present embodiment, since the first synthetic leather part 20A is made of a different material from the second synthetic leather part 20B, the stress which has been applied to the synthetic leather part 20 but has not been cancelled out by either the first synthetic leather part 20A or the second synthetic leather part 20B is applied to, for example, the first synthetic leather part 20A. This reduces the occurrence of distortion in the first sewing part S1, as shown in FIG. 4.

Figure 5:
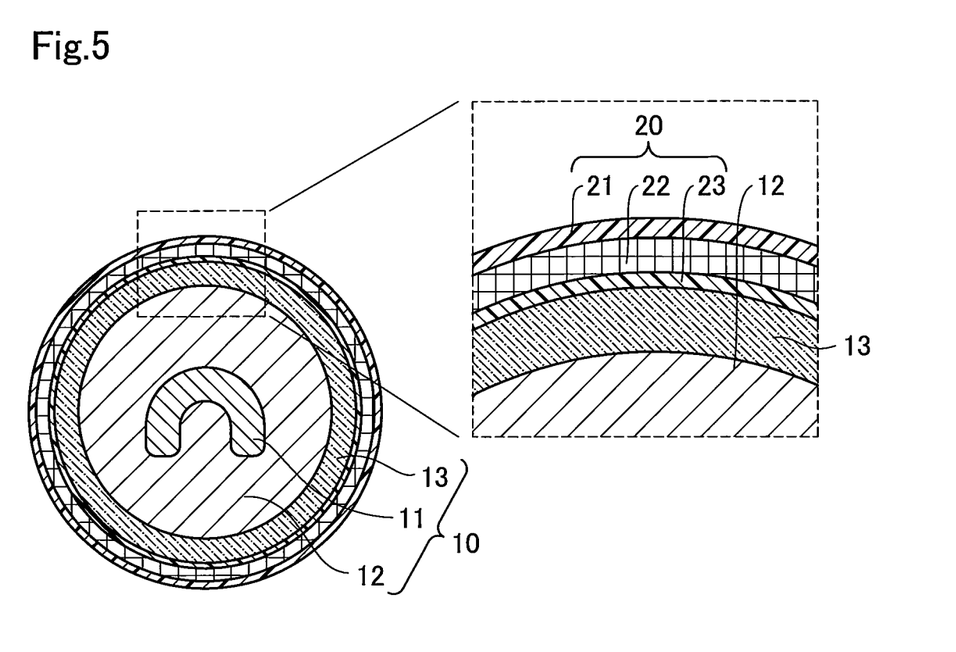
FIG. 5 is a schematic sectional diagram obtained by cutting at a V-V line in FIG. 1.

FIG. 5 is the schematic sectional diagram obtained by cutting the steering device 100 at the V-V line in FIG. 1. As shown in FIG. 5, the synthetic leather part 20 is wrapped outer surface of the main body 10 including the metal core 11, the cushion layer 12 and the functional layer 13.

In the steering device 100 according to the present embodiment described above, the first synthetic leather part 20A is made of a different material from the second synthetic leather parts 20B. Since each of the first sewing parts S1 is formed to extend in a direction not toward the center oc in the front view of the steering device 100, the stress which has been applied to the synthetic leather part 20 but has not been cancelled out by, for example, the second synthetic leather parts 20B is able to be cancelled out by the first synthetic leather part 20A made of a harder material than the second synthetic leather parts 20B. This reduces the occurrence of distortion in the first sewing parts S1, and accordingly reduces the occurrence of distortion in the synthetic leather part 20.

The first synthetic leather part 20A has a coating layer 21, a base fabric layer 22, and a lining layer 23. The first synthetic leather part 20A is formed by laminating the coating layer 21, the base fabric layer 22, and the lining layer 23, in this order. The synthetic leather part 20 covers the main body 10 so that the coating layer 21 is arranged as the surface. The coating layer 21 is made of, for example, resin. The base fabric layer 22 is made of, for example, woven fabric, knitted fabric, or non-woven fabric. The lining layer 23 is made of, for example, sponge such as urethane foam. As with the first synthetic leather part 20A, the second synthetic leather parts 20B and the third synthetic leather part 20C, respectively, have laminated layers of the coating layer 21, the base fabric layer 22, and the lining layer 23.

Figure 6:
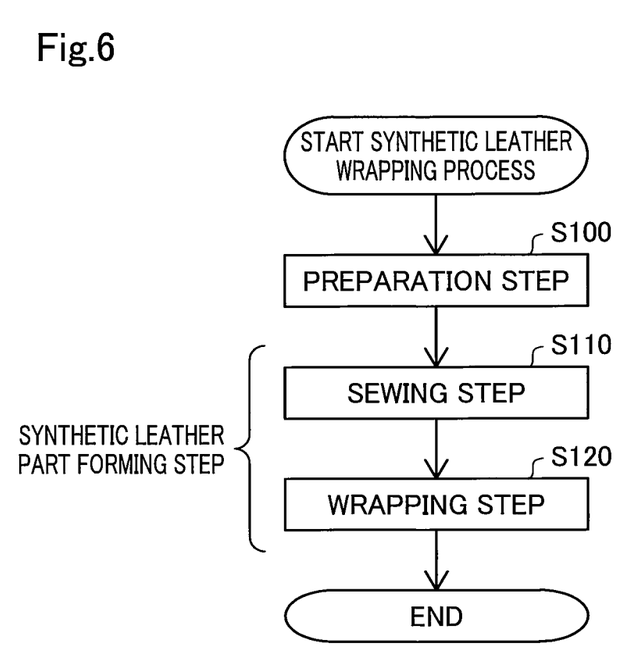
FIG. 6 is a flowchart indicating one example of a synthetic leather wrapping process.

FIG. 6 is a flowchart indicating one example of a synthetic leather wrapping process. The synthetic leather wrapping process is executed to wrap the synthetic leather part 20 around the main body 10. Step S100 involves preparing the main body 10. The step is also referred to as "preparation step".

Step S110 involves sewing together the first synthetic leather part 20A and the second synthetic leather parts 20B respectively, and sewing together the second synthetic leather parts 20B and the third synthetic leather part 20C respectively. In the present embodiment, the first synthetic leather part 20A and the second synthetic leather part 20B are sewed together while the first synthetic leather part 20A is pulled in the width direction of the first synthetic leather part 20A. The first synthetic leather part 20A is made of a harder material than the second synthetic leather parts 20B, thereby reducing the occurrence of distortion in the first sewing parts S1. The second synthetic leather parts 20B and the third synthetic leather part 20C are sewed together while the third synthetic leather part 20C is pulled in the width direction of the third synthetic leather part 20C. The third synthetic leather part 20C is made of a less stretchable material than the second synthetic leather parts 20B, thereby reducing the occurrence of distortion in the second sewing parts S2. The step is also referred to as "sewing step".

Step S120 involves wrapping the synthetic leather part 20 around the main body 10. More specifically, the step involves wrapping the first synthetic leather part 20A around the upper part of the main body 10, wrapping the second synthetic leather parts 20B around the grip parts of the main body 10, and wrapping the third synthetic leather part 20C around the lower part of the main body 10. The step is also referred to as "wrapping step". Step S110 and step S120 may be executed in any order, not limited to this order, or may be executed in parallel. The combination of step S110 and step S120 is also referred to as "synthetic leather part forming step".

In the steering 100 according to the present embodiment described above, the first synthetic leather part 20A is made of a different material from the second synthetic leather parts 20B. Since each of the first sewing parts S1 is formed to extend in a direction not toward the center oc in the front view of the steering 100, the stress which has been applied to the synthetic leather part 20 but has not been cancelled out by, for example, the second synthetic leather parts 20B is able to be cancelled out by the first synthetic leather part 20A made of a harder material than the second synthetic leather parts 20B. This reduces the occurrence of distortion in the first sewing parts S1, and accordingly reduces the occurrence of distortion in the synthetic leather part 20.

The second synthetic leather parts 20B are made of a different material from the third synthetic leather part 20C. Since each of the second sewing parts S2 is formed to extend in a direction not toward the center oc in the front view of the steering device 100, the stress which has been applied to the synthetic leather part 20 but has not been cancelled out by, for example, the second synthetic leather parts 20B is able to be cancelled out by the third synthetic leather part 20C made of a less stretchable material than the second synthetic leather parts 20B. This reduces the occurrence of distortion in the second sewing parts S2, and accordingly reduces the occurrence of distortion in the synthetic leather part 20.

The second synthetic leather parts 20B are made of a more stretchable material than the first synthetic leather part 20A and the third synthetic leather part 20C. Therefore, when the second parts P2 has a larger area than the area of the first part P1 and the area of the third part P3, by covering the second part 20B with the second synthetic leather having a smaller area than the second part P2 area, appearance of wrinkles in the synthetic leather part 20 can be reduced.

B. Other Embodiments (B1) In the embodiment described above, the steering device 100 has a substantially rectangular shape. Alternatively, the steering device 100 may have a substantially circular shape or a substantially elliptical shape. Further, the steering device 100 may have a control-stick-like shape, or a letter-D shape where a substantially elliptical shape partially has a straight line.

(B2) In the embodiment described above, the synthetic leather part 20 has the first synthetic leather part 20A, the second synthetic leather parts 20B, and the third synthetic leather part 20C. Alternatively, the synthetic leather part 20 may have at least the first synthetic leather part 20A and the second synthetic leather part 20B. For example, the synthetic leather part 20 wrapped around the main body 10 in the third part P3 may be the first synthetic leather part 20A.

(B3) In the embodiment described above, the first synthetic leather part 20A has different hardness and stretchability from the second synthetic leather parts 20B. In another example, as long as the first synthetic leather part 20A is made of a different material from the second synthetic leather parts 20B, the first synthetic leather part 20A may have different hardness from the second synthetic leather parts 20B, and the same stretchability as the second synthetic leather parts 20B.

(B4) In the embodiment described above, the third synthetic leather part 20C is harder than the first synthetic leather part 20A. Alternatively, the third synthetic leather part 20C may have the same hardness as or lower hardness than the first synthetic leather part 20A. The first synthetic leather part 20A is more stretchable than the third synthetic leather part 20C. Alternatively, the first synthetic leather part 20A may have the same stretchability as or lower stretchability than the third synthetic leather part 20C.

The present disclosure may be embodied in various configurations without departing from the spirit of the present disclosure, not limited to the above-described embodiments. For example, the technical features in the embodiments corresponding to the technical features in the respective aspects disclosed in the summary above may be appropriately replaced or combined in order to solve the above-described problem, or in order to achieve some or all of the above-described effects. Any of the technical features not described as essential in the present specifications may be omitted appropriately.

What is claimed is:

1. A steering device comprising:
a main body including a metal core; and
a synthetic leather part wrapped around the main body, wherein
the synthetic leather part comprises a first synthetic leather part, a second synthetic leather part, and a first sewing part, the second synthetic leather part is made of a different material from the first synthetic leather part, the first sewing part has a linear shape formed by sewing the first synthetic leather part and the second synthetic leather part together, and
the first sewing part is formed to extend in a direction not toward a center of the steering device in a front view of the steering device, wherein
the first synthetic leather part has a different hardness from the second synthetic leather part.

2. A steering device comprising:
a main body including a metal core; and
a synthetic leather part wrapped around the main body, wherein
the synthetic leather part comprises a first synthetic leather part, a second synthetic leather part, and a first sewing part, the second synthetic leather part is made of a different material from the first synthetic leather part, the first sewing part has a linear shape formed by sewing the first synthetic leather part and the second synthetic leather part together, and
the first sewing part is formed to extend in a direction not toward a center of the steering device in a front view of the steering device, wherein
the first synthetic leather part has a different stretchability from the second synthetic leather part.

3. A steering device comprising:
a main body including a metal core; and
a synthetic leather part wrapped around the main body, wherein
the synthetic leather part comprises a first synthetic leather part, a second synthetic leather part, and a first sewing part, the second synthetic leather part is made of a different material from the first synthetic leather part, the first sewing part has a linear shape formed by sewing the first synthetic leather part and the second synthetic leather part together, and
the first sewing part is formed to extend in a direction not toward a center of the steering device in a front view of the steering device, wherein
the main body comprises an upper part, a grip part, and a lower part,
the synthetic leather part further comprises a third synthetic leather part and a second sewing part, the third synthetic leather part is made of a different material from the second synthetic leather part, and the second sewing part has a linear shape formed by sewing the second synthetic leather part and the third synthetic leather part together,
the first synthetic leather part is wrapped around the upper part, and is made of a harder material than the second synthetic leather part,
the second synthetic leather part is wrapped around the grip part, and is more stretchable than the first synthetic leather part and the third synthetic leather part, and
the third synthetic leather part is wrapped around the lower part.

* * * * *